(No Model.)

J. SANDALL.
LUBRICATOR.

No. 472,827. Patented Apr. 12, 1892.

WITNESSES:
F. McArdle
C. Sedgwick

INVENTOR:
J. Sandall
BY Munn & Co.
ATTORNEYS

UNITED STATES PATENT OFFICE.

JOHN SANDALL, OF NEW YORK, N. Y.

LUBRICATOR.

SPECIFICATION forming part of Letters Patent No. 472,827, dated April 12, 1892.

Application filed March 30, 1891. Serial No. 387,002. (No model.)

*To all whom it may concern:*

Be it known that I, JOHN SANDALL, of New York city, in the county and State of New York, have invented a new and Improved Feed for Lubricating Devices, of which the following is a full, clear, and exact description.

My invention relates to an improvement of the feed for oil-cups and equivalent lubricating devices, and has for its object to provide a siphon-feed capable of use without a wick, and which will convey the most viscous oil from the lubricating device to a bearing in an efficient manner.

A further object of the invention is to provide a siphon-feed with a valve, whereby the quantity of oil to be fed may be controlled, and also to so construct the siphon-feed that the siphon may be removed from the lubricating device and laid to one side without danger of the oil contained therein and held by a vacuum oozing out or spilling, thus destroying the siphon effect.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in both the views.

Figure 1:
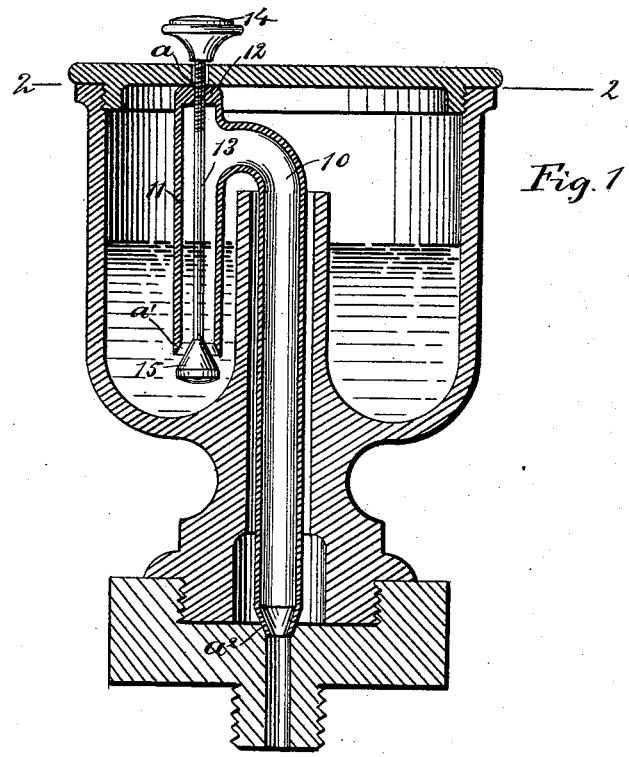
Figure 2:
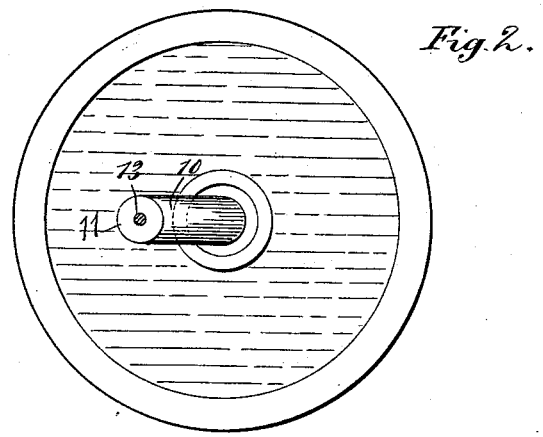

Figure 1 is a central vertical section through a lubricating device, illustrating the application of the siphon-feed, the said siphon-feed being also in vertical section; and Fig. 2 is a horizontal section taken practically on the line 2 2 of Fig. 1.

The feed device constituting the feature of the invention is shaped as a siphon, embodying a long member 10 and a shorter member 11. Preferably in the upper end of the short member a threaded aperture 12 is produced, and a rod 13 is introduced through the aperture into the said member of the siphon, the upper portion of the rod being provided with an exterior thread, as illustrated at $a$ in Fig. 1, and the rod is turned through the medium of an attached knob 14 or any equivalent thereof. The lower end of the rod 13 has a valve 15 rigidly secured thereto, the said valve being adapted to close or to partially close the lower end of the siphon member in which the rod is located. The valve is preferably of conical shape, and the inner surface of the siphon at the extremity surrounding the valve is beveled to form a seat $a'$ therefor. The lower extremity of the longer member of the siphon is preferably made conical, as illustrated at $a^2$ in Fig. 1, and by thus shaping this portion of the siphon the outlet is of much less diameter than the diameter of the body.

I desire it to be distinctly understood that the location of the valve may be somewhat changed without departing from the spirit of the invention; that the valve may be otherwise manipulated than in the manner shown, and that the entire device may be placed in a lubricating device in any manner best adapted to the construction of the device and to obtain a proper feed.

Before the feeder is placed in the oil-cup it is filled with oil, whereupon when the shorter member of the feed is introduced in the oil of the cup and the valve is opened a regular siphonage action will take place, and oil will flow from the longer member. In the drawings the feed is illustrated as applied to an ordinary oil-cup, and the longer member of the siphon is placed in the tube of the cup usually employed to hold the wick and conductors of oil contained in the body of the cup and siphoned through the shorter end of the device to the bearings to be lubricated. It is evident that by manipulating the valve 15 more or less oil may be admitted to the siphon-tube and fed from the cup to the bearings, and, further, that by decreasing the outlet of the longer member, the valve at the shorter member being closed, the oil will be held in suspension when the device is lifted from the cup. Thus the feed-tube will be always filled and ready to be placed back again when removed from the cup for purposes of cleaning or for repair.

Having thus described my invention, I claim as new and desire to secure by Letters Patent—

1. In a lubricator, a feed consisting in a siphon having an inlet-valve provided with an operating-stem connected therewith and projecting above the bend of the siphon, substantially as set forth.

2. In a lubricator, a feed consisting in the siphon, an inlet-valve closing upwardly in the lower end of the short leg, a stem extending from the valve up through said leg and above the bend of the siphon and provided with an operating head or handle, substantially as set forth.

3. The combination, with an oil-cup having an outlet in its base or cap, of a siphon having an unobstructed bore and having the lower end of its long leg contracted and closely fitting said outlet and a valve for opening and closing the bore of the siphon, substantially as set forth.

4. The combination, with an oil-cup having an aperture in its top and an outlet in its bottom, of a siphon in the cup, with the lower end of its long arm closely fitting the said outlet and having a valve in its short arm provided with a stem extending up through said top opening, substantially as set forth.

5. The combination, with the oil-cup having an aperture in its top and an outlet in its bottom, of a siphon within the cup, with the lower end of its long arm closely fitting said outlet, the valve 15, closing upwardly in the lower end of the short arm, the valve-stem 13, extending up through said arm and having a threaded portion passing through the upper end thereof and through the aperture in the top of the oil-cup, the said top engaging the upper end of the siphon and holding its lower end in said outlet, substantially as set forth.

JOHN SANDALL.

Witnesses:
J. FRED. ACKER,
E. M. CLARK.